Patented Nov. 19, 1929

1,735,916

UNITED STATES PATENT OFFICE

ANTON BOERDER, OF CLEVELAND, OHIO

TIRE MOLD

No Drawing. Application filed June 30, 1928. Serial No. 289,621.

This invention relates to molds for the manufacture of rubber articles, and the invention has particular reference to molds such as are employed in the production of inner tubes for automotive vehicle pneumatic tires.

A mold of the type to which reference is had may be in two pieces, each of cast iron and having a steam jacket whereby the same may be suitably heated during the curing operation. It will be understood that each piece has a rubber receiving recess of generally semi-circular section, so that the pieces when closed and clamped together form a steam-jacketed cavity of the proper conformation to produce the desired shape in rubber. The mold recess surface which is the molding surface in contact with the rubber during the curing operation ordinarily is highly polished, but notwithstanding such precaution a great deal of difficulty is encountered by the tendency of the rubber to adhere to this surface upon completion of the curing process.

Numerous expedients for overcoming this difficulty have been tried without entire success. One of such means employed has been to electroplate on the recess surface of the mold, as with copper or nickel, but plating with such metals has been found not entirely satisfactory for the purpose.

It is an object of my invention to do away with all such tendency of the rubber to stick to the mold and at the same time preserve the life of the mold.

According to my invention I electroplate upon the surface of the mold recess a coating of zirconium. The amount of the deposit is not material so far as I know, although I have found about 0.002 inch thickness to be satisfactory.

The exact explanation of the success of zirconium when so used I am unable to give but I have found zirconium to be highly successful for the purpose, and beyond comparison with any of the numerous other plating metals which I have tried; the cured rubber in every instance coming freely from the mold when the mold is opened.

What I claim is:

A mold for curing rubber and having a coating of zirconium upon its molding surface.

Signed by me, this 7th day of June, 1928.

ANTON BOERDER.